(12) United States Patent
Chapman

(10) Patent No.: US 10,316,511 B1
(45) Date of Patent: Jun. 11, 2019

(54) BOLT CALIBRATED ANGLE MAINSTAY FOR TOWER CONSTRUCTION AND METHOD FOR USE

(71) Applicant: Valmont Industries, Inc., Omaha, NE (US)

(72) Inventor: Brandon M. Chapman, Bourbon, IN (US)

(73) Assignee: Valmont Industries, Omaha, NE (US)

( * ) Notice: Subject to any disclaimer, the term of this patent is extended or adjusted under 35 U.S.C. 154(b) by 0 days.

(21) Appl. No.: 15/892,469

(22) Filed: Feb. 9, 2018

Related U.S. Application Data

(60) Provisional application No. 62/458,747, filed on Feb. 14, 2017.

(51) Int. Cl.
*E04B 1/38* (2006.01)
*E04B 1/41* (2006.01)
*E04H 12/10* (2006.01)

(52) U.S. Cl.
CPC .............. *E04B 1/40* (2013.01); *E04H 12/10* (2013.01); *E04B 2001/405* (2013.01)

(58) Field of Classification Search
CPC ...... E04B 1/40; E04B 2001/405; E04H 12/10
USPC .......................................................... 52/698
See application file for complete search history.

(56) References Cited

U.S. PATENT DOCUMENTS

| | | | |
|---|---|---|---|
| 2,990,151 A | 6/1961 | Phillips | |
| 4,768,741 A | 9/1988 | Logsdon | |
| 4,993,670 A * | 2/1991 | Tesar | F16L 3/1091 248/68.1 |
| 5,118,060 A | 6/1992 | Spronken | |
| 5,718,403 A | 2/1998 | Ott et al. | |
| 5,785,447 A | 7/1998 | Fonti et al. | |
| 6,095,466 A | 8/2000 | Sener et al. | |
| 6,185,303 B1 | 2/2001 | Losey | |
| 6,209,832 B1 | 4/2001 | Yamazaki | |
| 6,232,928 B1 * | 5/2001 | Zimmerman | H01Q 1/1242 343/882 |
| 6,406,008 B1 | 6/2002 | Dudding et al. | |
| 6,913,422 B2 | 7/2005 | Rogers | |
| 7,213,376 B2 | 5/2007 | Puikkanen et al. | |
| 7,866,616 B2 | 1/2011 | Wen et al. | |
| 8,919,072 B2 | 12/2014 | Han | |
| 9,869,108 B2 * | 1/2018 | Butler | E04H 12/24 |
| 9,879,818 B2 * | 1/2018 | Adams | F16M 13/02 |
| 2005/0284995 A1 * | 12/2005 | Hutter, III | B64C 1/406 248/235 |

(Continued)

*Primary Examiner* — Basil S Katcheves
(74) *Attorney, Agent, or Firm* — Milligan PC LLO

(57) ABSTRACT

The present invention provides a system which allows users to mount multiple pieces of equipment to a tower and it has the unique capability to adjust a steel frame to level without additional equipment. In accordance with a first preferred embodiment, the present invention includes a duel locking system that includes a taper adjusting bolt to adjustably position the frame level with the earth. Further, the dual locking system of the present invention preferably further includes the use of retaining bolts to keep the assembly positioned correctly. According to a further aspect of the present invention, once the taper adjusting bolt is in its desired position, the retaining bolts are preferably tightened to lock the frame in place, with the taper adjusting bolt acting as a redundant measure to help maintain the level state.

7 Claims, 4 Drawing Sheets

(56) References Cited

U.S. PATENT DOCUMENTS

2009/0152419 A1    6/2009  Wallace
2011/0083399 A1*   4/2011  Lettkeman .............. E04H 12/24
                                                    52/745.21

* cited by examiner

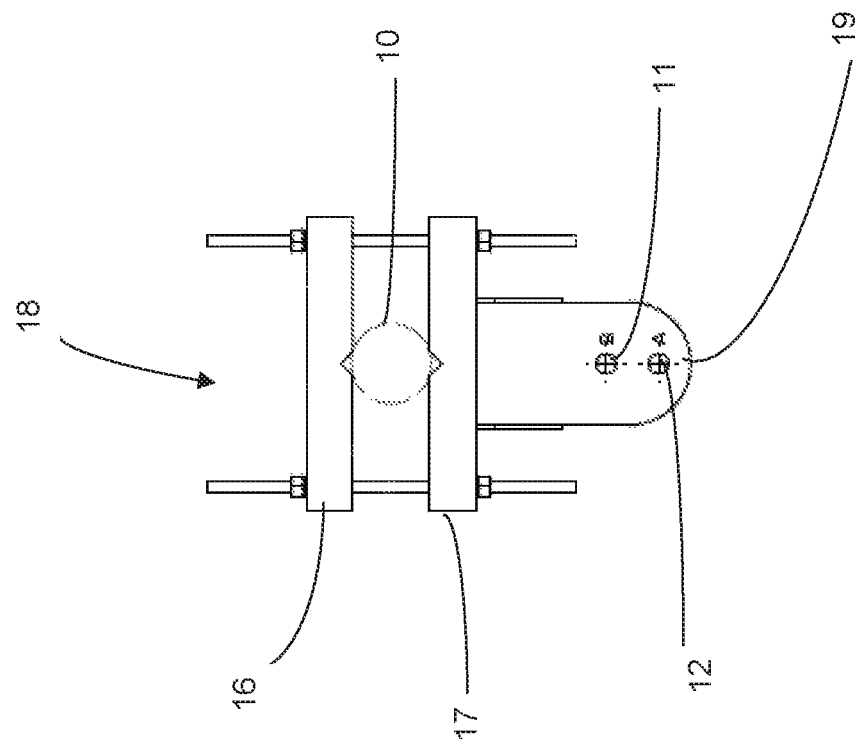
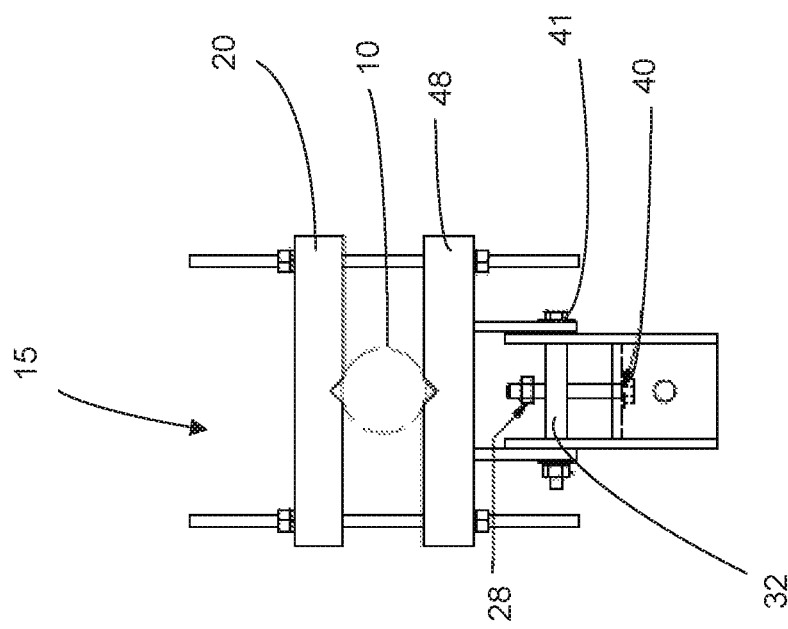
FIG. 5
FIG. 4

US 10,316,511 B1

BOLT CALIBRATED ANGLE MAINSTAY FOR TOWER CONSTRUCTION AND METHOD FOR USE

RELATED APPLICATIONS present application claims priority to U.S. Provisional Application No. 62/458,747 filed Feb. 14, 2017.

FIELD OF INVENTION

The present invention is related in general to leg connections for tower constructions and, in particular, to a bolt calibrated angle mainstay.

BACKGROUND OF THE INVENTION

Installing and constructing a vertical tower frame involves a significant number of man hours. In particular, large amounts of man hours are required to properly taper vertical towers during construction while keeping horizontal tower elements level. This is because bending and adjusting the heavy, metal members of the tower is difficult and imprecise.

Current universal leg connection requires some form of an external force to physically move the frame to a desired taper. This external force can come from many devises (cranes, come-along, ropes and pulleys, or human exertion). These methods are bulky, expensive, and typically imprecise. Other designs use multiple holes to accomplish different tapers. These require precise measurements before installation and do not allow for a universal range of adjustment.

SUMMARY OF THE DISCLOSURE

To overcome the limitations of the prior art, the present invention provides a system and method which allows users to mount multiple pieces of equipment to a tower and it has the unique capability to adjust a steel frame to level without any additional equipment. In accordance with a first preferred embodiment, the present invention includes a duel locking system that includes a taper adjusting bolt to adjustably position the frame level with the earth. Further, the dual locking system of the present invention preferably further includes the use of retaining bolts to keep the assembly positioned correctly.

According to a still further aspect of the present invention, once the taper adjusting bolt is in its desired position, the retaining bolts are preferably tightened to lock the frame in place. Finally, the taper adjusting bolt preferably acts as a redundant measure to help maintain the level state.

One advantage of the present invention is that it allows the user to adjust or move a frame when loaded. Such adjustments are more precise because the added forces applied are the same forces that will be present when the installation is complete. Further, because of its unique screw-type adjustment design, the present invention further allows for an exact taper adjustment.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

BRIEF DESCRIPTION OF THE DRAWINGS

Elements in the figures have not necessarily been drawn to scale in order to enhance their clarity and to improve the understanding of the various elements and embodiments of the invention. Furthermore, elements that are known to be common and well understood to those in the industry are not depicted in order to provide a clear view of the various embodiments of the invention. Thus, it should be understood that the drawings are generalized in form in the interest of clarity and conciseness.

FIG. 4 illustrates a top-down view of the upper portion of the bolt calibrated angle mainstay shown in FIG. 1.

FIG. 5 illustrates a top-down view of the lower portion of the bolt calibrated angle mainstay shown in FIG. 1.

DETAILED DESCRIPTION OF THE DRAWINGS

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

Figure 1:
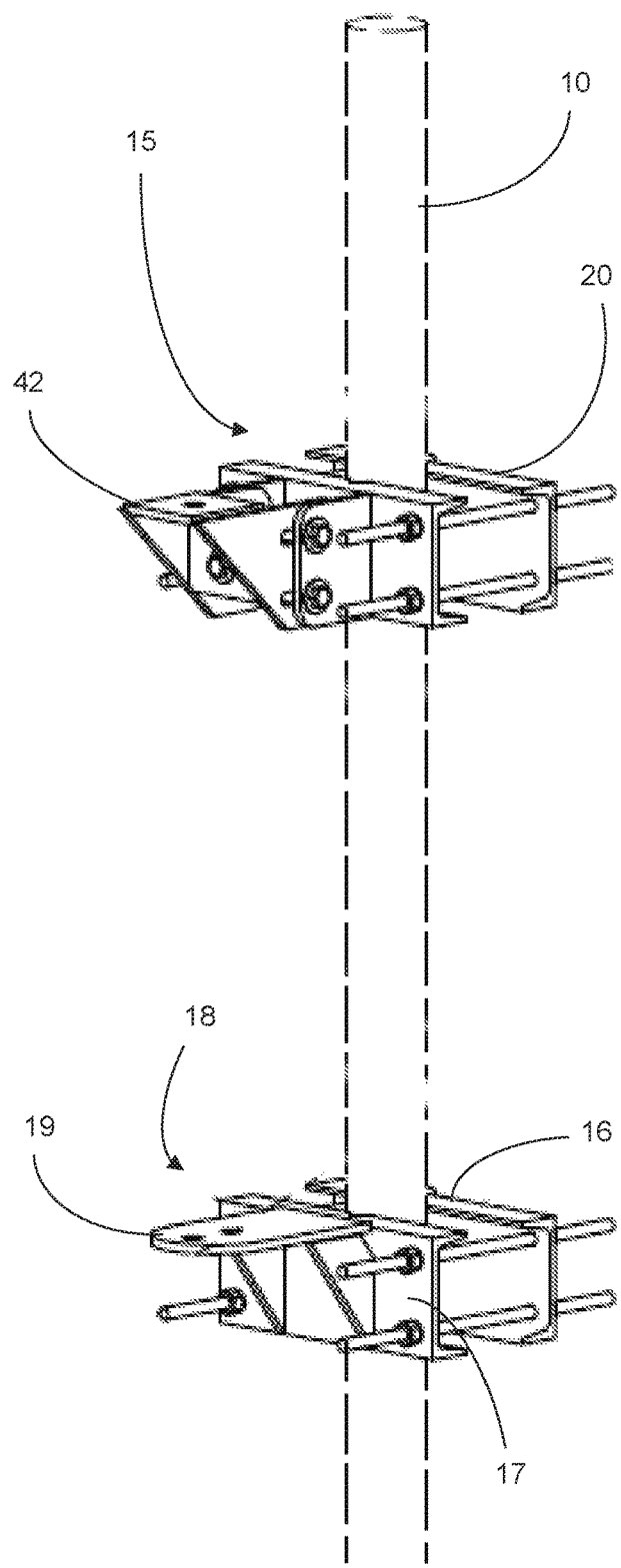
FIG. 1 illustrates a perspective view of a bolt calibrated angle mainstay in accordance with a first preferred embodiment of the present invention.

With reference now to FIG. 1, a first perspective view of a bolt calibrated angle mainstay in accordance with a first preferred embodiment of the present invention shall now be discussed. As shown in FIG. 1, the bolt calibrated angle mainstay of the present invention preferably includes an upper bracket element 15 and a lower bracket element 18 for securing to a common pole or beam 10. As further shown, the upper bracket element 15 as shown preferably further includes a straight slot weldment 42 and a securing back bracket 20. Additionally, the lower bracket element 15 preferably includes a multi-hole taper plate weldment 19, a rear backing bracket 16 and a front plate 17.

Figure 2:
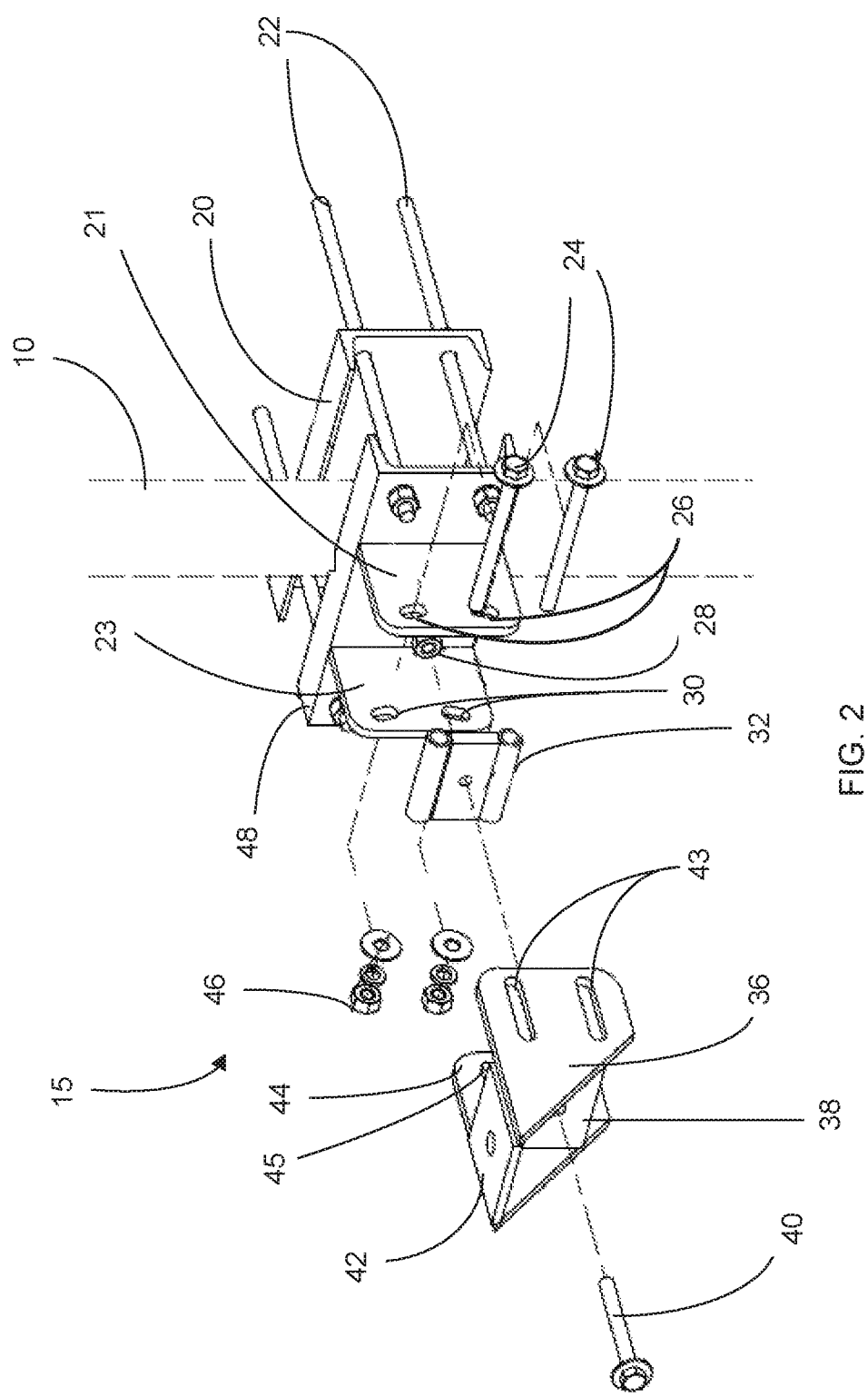
FIG. 2 illustrates an exploded view of a upper portion of the bolt calibrated angle mainstay shown in FIG. 1.

With reference now to FIG. 2, an exploded view of the upper bracket element 15 is provided. As shown, the upper bracket element 15 preferably includes a front plate 48 connected to a securing back bracket 20 via a plurality of connecting bolts 22 to secure to a pole 10. As further shown, the front plate 48 preferably further includes a right front wing 23 with a plurality of right wing slots 30 and a left front wing 21 with a plurality of left wing slots 26. The upper bracket element 15 further includes a straight slot weldment 42 which includes a right side element 44, a left side element 36 and a front section adjusting bolt guide 38.

As shown, the right and left side elements 36, 44 preferably include a plurality of slide slots 43, 45. According to a further preferred embodiment, the straight slot weldment 42 is designed to slide over a front positioning plate 32 and between the right front wing 23 and the left front wing 21. Preferably these pieces are made to align so that the retaining bolts 24 may extend sequentially through the left wing slots 26, the left wall slots 43, the positioning plate 32, the right wall slots 45 and the right wing slots 30 and secured with a securing element 46 (i.e. washers, nuts and the like). Finally, the upper bracket element 15 preferably includes an adjusting bolt 40 which extends sequentially through the adjusting bolt guide 38, the positioning plate 32 and into hex nut 28. According to a preferred aspect of the present invention, the adjusting bolt 40 is engaged and screwed into the positioning plate 32 so that tightening the adjusting bolt 40 causes the straight slot weldment 42 to move along the retaining bolts 24, thus changing the distance between the straight slot weldment 42 and the front plate 48.

Figure 3:
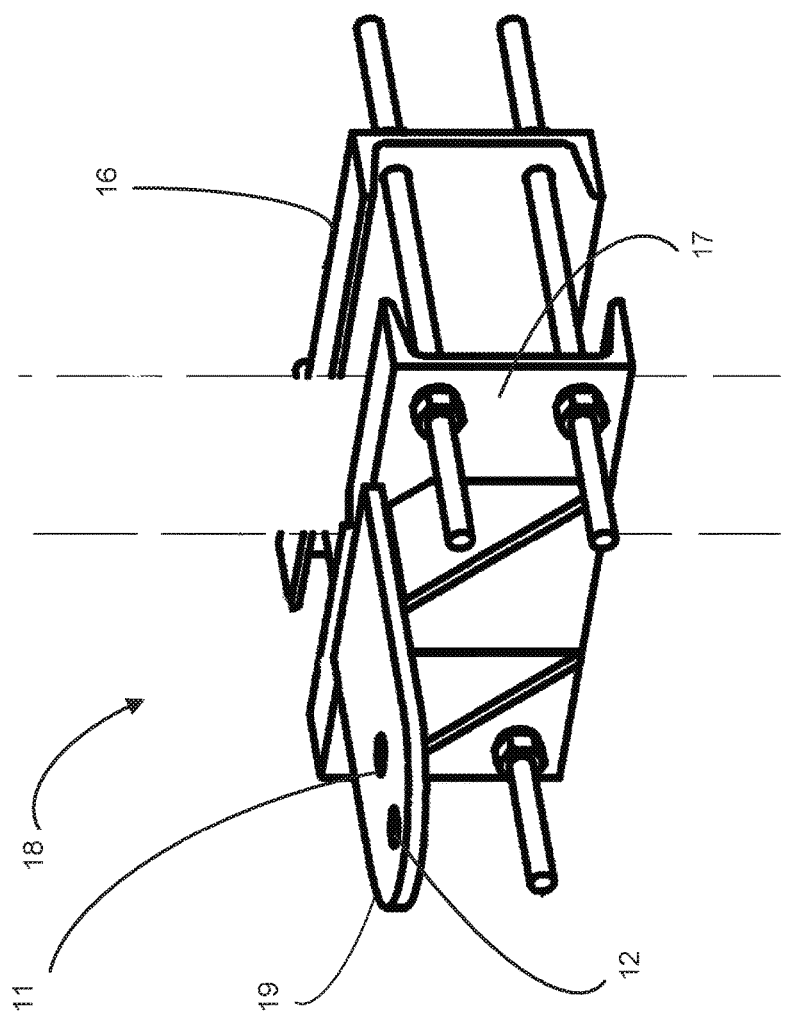
FIG. 3 illustrates a side perspective view of the lower portion of the bolt calibrated angle mainstay shown in FIG. 1.

With reference now to FIG. 3, the lower bracket element 18 shall now be further discussed. As shown in FIG. 3, the lower bracket element 18 preferably includes a backing bracket 16 which is connected to a front plate 17 and secured to a pole. Further, the lower bracket element 18 preferably further includes a multi-hole taper plate 19 which further includes a higher angle taper hole 11 and lower angle taper hole 12.

With reference now to FIGS. 4 and 5, a preferred method for use of the bolt calibrated angle mainstay of the present invention shall now be discussed. As shown in FIG. 4, the upper bracket element 15 is preferably installed by securing a pole 10 between the front plate 48 and a backing bracket 20. As shown in FIG. 5, the lower bracket element 18 is preferably secured to the pole 10 beneath the upper bracket element 15 via the lower front plate 17 and the lower backing plate 16.

Once installed, the angle of the bolt calibrated angle mainstay of the present invention may preferably be calibrated/adjusted by first measuring the tower taper of the tower under construction. Depending on the angle of the taper, the user may, for example, preferably select either the low angle taper hole 12 or the high angle taper hole 11 as desired.

It should be understood that the respective angles of the high and low high angle taper holes 11, 12 may be any pairing of angles calibrated for a given application. According to a first preferred embodiment, the low angle taper hole 12 may be, for example, between −2.5° and 2.5° on the multi-hole taper plate weldment 19. According to a further preferred embodiment, the high angle taper hole 11 may preferably be between 1.7° and 6°. According to still further aspects of the present invention, the number of angle adjustments may be greatly expanded so that an infinite number of taper adjustments may be available. For example, any angle between −10° and +10° could be chosen. Further, the selection of angles could be made by a variety of mechanisms (i.e. a variety of holes, notches, slots and/or adjustable screws and the like.)

Thereafter, the user preferably turns the adjusting bolt 40 to adjust the frame to the desired taper and level. Finally, the user preferably torques the retaining bolts 41 (preferably to 75 lbs. or more) and advances the locking nut 28 to the front of the positioning plate 32. In accordance with a further preferred embodiment, once the taper adjusting bolt 40 is in its desired position, the retaining bolts 41 are preferably tightened to lock the frame in place, with the taper adjusting bolt 41 acting as a redundant measure to help maintain the level state.

Unless the context clearly requires otherwise, throughout the description and the claims, the words 'comprise,' 'comprising,' and the like are to be construed in an inclusive sense as opposed to an exclusive or exhaustive sense, that is to say, in a sense of 'including, but not limited to.' Words using the singular or plural number also include the plural or singular number respectively. Additionally, the words, 'herein,' 'hereunder,' 'above,' 'below,' and words of similar import refer to this application as a whole and not to any particular portions of this application. When the word 'or' is used in reference to a list of two or more items, that word covers all of the following interpretations of the word: any of the items in the list, all of the items in the list and any combinations of the items in the list.

The above description of illustrated embodiments of the systems and methods is not intended to be exhaustive or to limit the systems and methods to the precise form disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other processing systems and methods, not only for the systems and methods described above.

The elements and acts of the various embodiments described above can be combined to provide further embodiments. These and other changes can be made to the system and methods in light of the above detailed description.

In general, in the following claims, the terms used should not be construed to limit the systems and methods to the specific embodiments disclosed in the specification and the claims, but should be construed to include all processing systems that operate under the claims. Accordingly, the systems and methods are not limited by the disclosure, but instead the scope of the systems and methods is to be determined entirely by the claims.

While certain aspects of the systems and methods are presented below in certain claim forms, the inventor contemplates the various aspects of the systems and methods in any number of claim forms. Accordingly, the inventor reserves the right to add additional claims after filing the application to pursue such additional claim forms for other aspects of the systems and methods.

What is claimed is:

1. An apparatus for adjusting a steel frame, the apparatus comprising:
    an upper bracket element, wherein the upper bracket element comprises a front plate, an upper backing bracket and a plurality of connecting bolts;
    wherein the front plate further comprises a right front wing having a plurality of right wing slots, and a left front wing having a plurality of left wing slots;
    a positioning plate;
    and a straight slot weldment, wherein the straight slot weldment is a distance from the front plate;
    wherein the straight slot weldment comprises a right side wall, a left side wall and a front section adjusting bolt guide; wherein the right and left side walls further comprise a plurality of right wall slots and left wall slots;
    wherein the positioning plate is positioned between the left side wall and the right side wall; further wherein the straight slot weldment is positioned between the left front wing and the right front wing;
    a plurality of adjusting bolts, wherein at least one adjusting bolt extends through a left wing slot, a left wall slot, the positioning plate, a right wall slot, and a right wing slot;
    an adjusting bolt guide;
    a securing nut;
    an adjusting bolt, wherein the adjusting bolt extends through the adjusting bolt guide, the positioning plate and into the securing nut; wherein the adjusting bolt is screwed into the securing nut so that tightening the adjusting bolt causes the straight slot weldment to move over the plurality of adjusting bolts and to change the distance between the straight slot weldment and the front plate; and a lower bracket element, wherein the lower bracket element comprises a lower backing bracket and a lower front plate;

wherein the lower front plate further comprises a multi-hole taper plate, wherein the multi-hole taper plate comprises a lower angle taper hole and higher angle taper hole; wherein the lower angle taper hole is positioned closer to the lower front plate than the higher angle taper hole.

2. A method of adjusting a steel frame, the method comprising:

providing an upper bracket element, wherein the upper bracket element comprises a front plate, an upper backing bracket and a plurality of connecting bolts; wherein the front plate comprises a right front wing having a plurality of right wing slots, and a left front wing having a plurality of left wing slots;

providing a positioning plate;

providing a straight slot weldment at a distance from the front plate; wherein the straight slot weldment is comprised of a right side wall, a left side wall and a front section adjusting bolt guide; wherein the right and left side walls further comprise a plurality of right wall slots and left wall shots; wherein the positioning plate is positioned between the left side wall and the right side wall; further wherein the straight slot weldment is positioned between the left front wing and the right front wing;

providing a plurality of adjusting bolts, wherein at least one adjusting bolt extends through a left wing slot, a left wall slot, the positioning plate, a right wall slot, and a right wing slot;

providing an adjusting bolt guide;

providing a securing nut;

providing an adjusting bolt, wherein the adjusting bolt extends through the adjusting bolt guide, the positioning plate and into the securing nut;

a lower bracket element, wherein the lower bracket element comprises a lower backing bracket and a lower front plate;

wherein the lower front plate further comprises a multi-hole taper plate, wherein the multi-hole taper plate comprises a lower angle taper hole and higher angle taper hole; wherein the lower angle taper hole is positioned closer to the lower front plate than the higher angle taper hole;

securing the upper bracket element to a pole, wherein the pole is secured between the front plate and the upper backing bracket; and securing the lower bracket element to the pole, wherein the lower bracket element is secured to the pole beneath the upper bracket element, wherein the pole is secured between the lower front plate and the lower backing plate.

3. The method of claim 2, wherein the method further comprises the step of determining the angle of tower taper of a tower.

4. The method of claim 3, wherein the method further comprises securing a framing element to the low angle taper hole when the measured taper is between −2.5° to 2.5°.

5. The method of claim 4, wherein the method further comprises screwing the adjusting bolt into the securing nut and moving the straight slot weldment over the plurality of adjusting bolts to change the distance between the straight slot weldment and the front plate.

6. The method of claim 3, wherein the method further comprises securing a framing element to the high angle taper hole if the measured taper is within the range of 1.7° to 6°.

7. The method of claim 6, wherein the method further comprises screwing the adjusting bolt into the securing nut and moving the straight slot weldment over the plurality of adjusting bolts to change the distance between the straight slot weldment and the front plate.

* * * * *